US009361579B2

(12) United States Patent
Fokoue-Nkoutche et al.

(10) Patent No.: US 9,361,579 B2
(45) Date of Patent: Jun. 7, 2016

(54) LARGE SCALE PROBABILISTIC ONTOLOGY REASONING

(75) Inventors: Achille B. Fokoue-Nkoutche, White Plains, NY (US); Aditya Kalyanpur, Westwood, NJ (US); Edith G. Schonberg, New York, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 1777 days.

(21) Appl. No.: 12/574,237

(22) Filed: Oct. 6, 2009

(65) Prior Publication Data

US 2011/0082828 A1    Apr. 7, 2011

(51) Int. Cl.
*G06N 5/02*   (2006.01)
*G06N 7/00*   (2006.01)

(52) U.S. Cl.
CPC . *G06N 5/02* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 2003/0074353 A1* | 4/2003 | Berkan | G06F 17/30684 |
| 2006/0053000 A1* | 3/2006 | Moldovan | G06F 17/30401 704/9 |
| 2007/0198448 A1 | 8/2007 | Fokoue-Nkoutche et al. | |
| 2007/0233627 A1* | 10/2007 | Dolby | G06N 5/02 706/45 |
| 2008/0091633 A1* | 4/2008 | Rappaport | G06N 5/022 706/50 |
| 2009/0070284 A1* | 3/2009 | Tunstall-Pedoe | G06F 17/30654 706/50 |

OTHER PUBLICATIONS

Sycara, Semantic Web Services with Web Ontology Language (OWL-S)-Specification of Agent-Services for Darpa Agent Markup Language (DAML), cmu.edu for darpa.mil, AFRL-IF-RS-TR-2006-274, Apr. 2006, pp. 1-144.*
Wolff, "The SP Theory and the Representation and Processing of Knowledge", Soft Computing and Ontologies of Semantic Web, Ma, Ed. Springer-Verlag, Berlin, 2006, pp. 79-101.*
Sieg and Byrnes, "Normal Natural Deduction Proofs in Classical Logic", Studia Logic vol. 60, pp. 67-106, 1998.*
Zimmer "A Framework for Agent-Based Brokering of Reasoning Services", slides for Workshop on Logic, Proofs, and Programs, Nancy, Jun. 17-18, 2004, pp. 1-18.*
Sycara, "Semantic Web Services with Web Ontology Language (OWL-S)-Specification of Agent-Services for Darpa Agent Markup Language (DAML)", cmu.edu for darpa.mil, AFRL-IF-RS-TR-2006-274, Apr. 2006, pp. 1-144.*

(Continued)

*Primary Examiner* — Kakali Chaki
*Assistant Examiner* — Walter Hanchak
(74) *Attorney, Agent, or Firm* — Louis J. Percello; Ryan, Mason & Lewis, LLP

(57) ABSTRACT

Techniques for computing a solution to a query formulated against a knowledge base (KB) are provided. The techniques include receiving a query formulated against a knowledge base, wherein the knowledge base comprises a set of one or more axioms, wherein each axiom is annotated with a specific probability value indicating a degree of certainty assigned thereto, ignoring each probability value of the one or more axioms and computing a solution to the query, computing each of one or more justifications for the query solution, wherein computing each of one or more justifications for the query solution comprises determining a minimal set of one or more axioms in the knowledge base that entail the query solution, and using each probability value of the one or more axioms in each justification to compute a net probability of an inferred query solution.

25 Claims, 2 Drawing Sheets

(56) References Cited

OTHER PUBLICATIONS

Wolff, "The SP Theory and the Representation and Processing of Knowledge", Soft computing and Ontologies of Semantic Web, Ma, Ed., Springer-Verlag, Berlin, 2006, pp. 79-101.*

Sieg and Byrnes, "Normal Natural Deduction Proofs in Classical Logic", Studia Logic, vol. 60, pp. 67-106, 1998.*

Zimmer, "A Framework for Agent-Based Brokering of Reasoning Services", slides for Workshop on Logic, Proofs, and Programs, Nancy, Jun. 17-18, 2004, pp. 1-18.*

Huang et al., Reasoning with Inconsistent Ontologies, IJCAI 2005, pp. 1-6.

\* cited by examiner

LARGE SCALE PROBABILISTIC ONTOLOGY REASONING

FIELD OF THE INVENTION

Embodiments of the invention generally relate to information technology, and, more particularly, to ontology reasoning.

BACKGROUND OF THE INVENTION

Existing ontology reasoners are optimized to process relatively small, consistent and unambiguous knowledge bases (KBs). However, many KBs tend to be large, as well as inconsistent and ambiguous. This is especially true for ontologies that are derived from text analytic programs or programs that analyze the relationship between individuals from unstructured information. Collaborative development of the ontology also gives rise to inconsistencies, as does integration of different ontologies. As such, it there exists a need to reason over ontologies despite the presence of inconsistencies and/or uncertainty.

SUMMARY OF THE INVENTION

Principles and embodiments of the invention provide techniques for large scale probabilistic ontology reasoning. An exemplary method (which may be computer-implemented) for computing a solution to a query formulated against a knowledge base (KB), according to one aspect of the invention, can include steps of receiving a query formulated against a knowledge base, wherein the knowledge base comprises a set of one or more axioms, wherein each axiom is annotated with a specific probability value indicating a degree of certainty assigned thereto, ignoring each probability value of the one or more axioms and computing a solution to the query, computing each of one or more justifications for the query solution, wherein computing each of one or more justifications for the query solution comprises determining a minimal set of one or more axioms in the knowledge base that entail the query solution, and using each probability value of the one or more axioms in each justification to compute a net probability of an inferred query solution.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
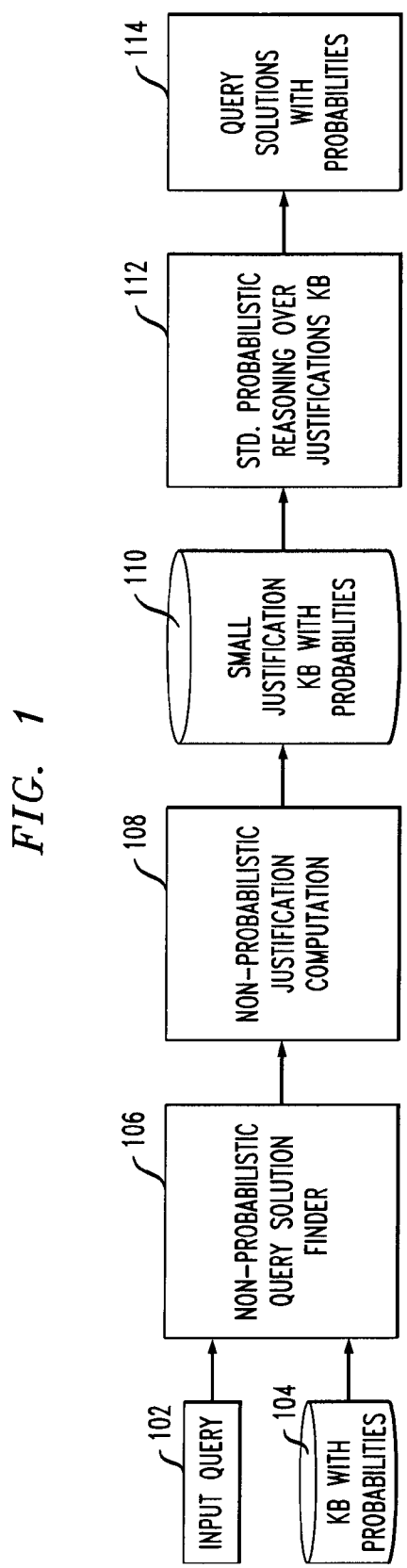
FIG. 1 is a block diagram illustrating an exemplary embodiment, according to an aspect of the invention.

Principles of the invention include large scale probabilistic ontology reasoning. One or more embodiments of the invention include scaling reasoning under uncertainty over very large, expressive and potentially inconsistent knowledge bases (KBs) without substantially changing the core reasoning techniques. Additionally, in one or more embodiments of the invention, uncertainty in the data can be represented using probabilities. As such, a knowledge base can include a set of axioms, each annotated with a specific probability value indicating the degree of certainty assigned thereto. Such a knowledge base can, for example, encode two contradictory facts with varying uncertainty.

The techniques detailed herein include computing meaningful answers to queries formulated against a KB. By way of example, all of the probability values of the axioms, can initially be ignored and a standard reasoning algorithm can be applied to compute answers to the query, while, at the same time, computing all justifications for the query answer (minimal sets of axioms in the KB that entail the answer). One or more embodiments of the invention additionally include using the probabilities of axioms in the justification to compute the net probability of the inferred answer. Also, justifications for the inconsistency of the KB can be taken into account to ensure that there is no interaction between the contradictory part of the KB and the consistent subset that entails the answer.

Unlike disadvantageous existing approaches which incorporate probability values of the axioms into the standard reasoning process, thus altering it significantly, the techniques described herein keep the standard reasoning process unchanged, and use the justifications as a basis for computing the probability of a solution.

One or more embodiments of the invention include implementing a logic independent approach that preserves the core logical reasoning algorithm as unchanged in the presence of probabilities. Additionally, in one or more embodiments of the invention, any probabilistic model can be used to determine the cumulative probability of an inference given the probabilities of the axioms in the justifications of the inference. Further, the techniques detailed herein can return locally sound solutions to the query in the presence of global inconsistencies in the KB, thus allowing for paraconsistent reasoning.

As described herein, one or more embodiments of the invention include computing "meaningful" answers to queries formulated against a possibly inconsistent and ambiguous KB. Note that in classical logic, every statement can be derived from an inconsistent KB, which means that for any given query, all answers are considered valid. This renders the KB useless. In one or more embodiments of the invention, however, a "meaningful" answer A to a query Q against a KB K must satisfy the following constraints:

(i). There exists a consistent sub-KB K' of K such that A is a first order logic answer of Q against K'. When this holds, it is said that A is a local answer to Q against K. This condition provides a sensible explanation by way of a consistent sub-KB that entails the answer.

(ii). A is not a local answer to not(Q) against K. This condition ensures that there is no sensible explanation for the fact that A is not an answer to Q.

In the presence of probabilities, one or more embodiments of the invention can use the strict notion above to guarantee "meaningful" solutions (that is, exclude any local answer A to Q if it is also a local answer to not Q). One or more embodiments of the invention can also leave the option to the user to specify a probabilistic threshold value T such that A is a "meaningful" answer for Q in K if P (A is a local answer for Q)>T and P (A is a local answer for not Q)<1−T.

Additionally, by way of example, ignoring probability values for the axioms, one or more embodiments of the invention can (a) compute all solutions to the query, and find all justifications for each solution. Note that if the KB is inconsistent, there could be some self-contradictory justifications (that is, justifications responsible for the inconsistency of the KB) that also entail the query solution (since it follows from classical logic), and one or more embodiments of the invention ignore these in step (d) detailed below. Step (a) can also, for example, be performed in a scalable way. Additionally, one or more embodiments of the invention can include (b) repeating step (a) for the negation of the query.

Further, one or more embodiments of the invention include removing from consideration all answers that are solutions to both the query (step (c)), and its negation (step (d)). Also, the techniques detailed herein can additionally allow the user to specify a threshold probabilistic value T for inclusion. For the remaining answers from step (c), one or more embodiments of the invention can use a user-specified probabilistic model to compute the net probability of an answer given the probabilities of the axioms in each of its justifications. By way of example, one or more embodiments of the invention can include considering only consistent justifications.

Note that the above definition and implementation of "meaningful" solutions supersedes that provided by existing approaches. For example, consider a KB K that has a consistent subset K1 which entails some axiom A, and another consistent subset K2 (of K) which entails the negation of A. One or more embodiments of the invention include implementation of a reasoner would not entail A or not(A), as either inference can be contradicted by another consistent fragment of the KB.

FIG. 1 is a block diagram illustrating an exemplary embodiment, according to an aspect of the invention. By way of illustration, FIG. 1 depicts an input query 102 and a knowledge base (KB) with probabilities 104, both of which are provided to a non-probabilistic query solution finder module 106 that determines a non-probabilistic solution to the query. Input from module 106 is provided to a non-probabilistic justification computation module 108 to compute each of one or more justifications for the query solution. Input from module 108 is provided to a small justification KB with probabilities 110, which provides input to a standard probabilistic reasoning over justifications KB module 112 to determine a query solution. Module 112 also outputs query solutions with probabilities 114.

Figure 2:
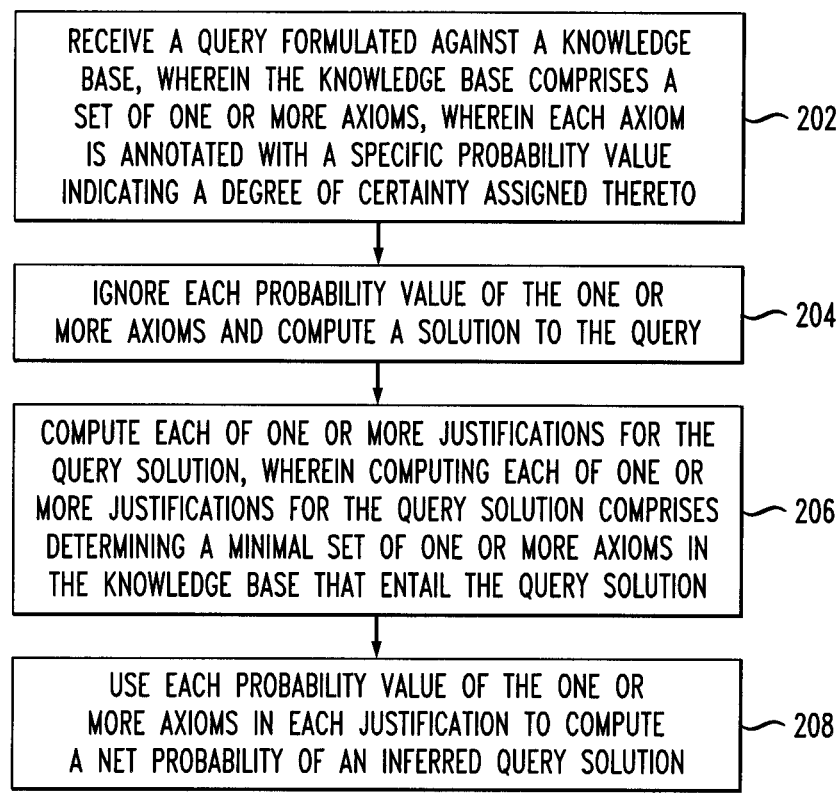
FIG. 2 is a flow diagram illustrating techniques for computing a solution to a query formulated against a knowledge base (KB), according to an embodiment of the invention.

FIG. 2 is a flow diagram illustrating techniques for computing a (meaningful) solution to a query formulated against a knowledge base (KB), according to an embodiment of the present invention. Step 202 includes receiving a query formulated against a knowledge base, wherein the knowledge base comprises a set of one or more axioms, wherein each axiom is annotated with a specific probability value indicating a degree of certainty assigned thereto. Step 204 includes ignoring each probability value of the one or more axioms and computing a solution to the query (for example, via applying a standard reasoning algorithm).

Step 206 includes computing each of one or more justifications for the query solution, wherein computing each of one or more justifications for the query solution comprises determining a minimal set of one or more axioms in the knowledge base that entail the query solution.

Step 208 includes using each probability value of the one or more axioms in each justification to compute a net probability of an inferred query solution. An inferred query solution is one that is not explicitly specified in the knowledge base (KB), but is logically implied by it. For example, if the KB explicitly states that "John Doe" is a "Basketball Player," but does not explicitly state that he is an "Athlete," and a user query asks for all "Athletes" in the KB, one or more embodiments of the invention can infer that status from other information in the KB (for example, via a rule that states that all "Basketball Players" are also "Athletes"). Such query solutions that are implied but not explicit are said to be inferred.

In one or more embodiments of the invention, the query solution satisfies one or more constraints such as, for example, that there exists a consistent sub-knowledge base of the knowledge base such that the query solution is a first order logic answer of the query against the sub-knowledge base, and that the query solution is not a local answer to not(Q) against the knowledge base, wherein Q is the query.

The techniques depicted in FIG. 2 can also include outputting the query solution to a display (for example, outputting a query solution data structure to a graphical user interface (GUI)). Additionally, one or more embodiments of the invention include taking into account one or more justifications for an inconsistency of the KB to ensure that there is no interaction between a contradictory part of the KB and a consistent subset that entails the query solution. The techniques detailed herein also include maintaining a standard reasoning process unchanged, as well as enabling a user to specify a probabilistic threshold value for the query solution.

One or more embodiments of the invention additionally include using a probabilistic model to determine a cumulative probability of an inference given each probability value of the axioms in each justification of the inferred query solution. Further, the techniques depicted in FIG. 2 can include facilitating paraconsistent reasoning by returning a locally sound solution to the query in a presence of one or more global inconsistencies in the knowledge base.

The techniques depicted in FIG. 2 can also, as described herein, include providing a system, wherein the system includes distinct software modules, each of the distinct software modules being embodied on a tangible computer-readable recordable storage medium. The distinct software modules can include, for example, a non-probabilistic query solution finder module, a non-probabilistic justification computation module and a standard probabilistic reasoning over justifications knowledge base module executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
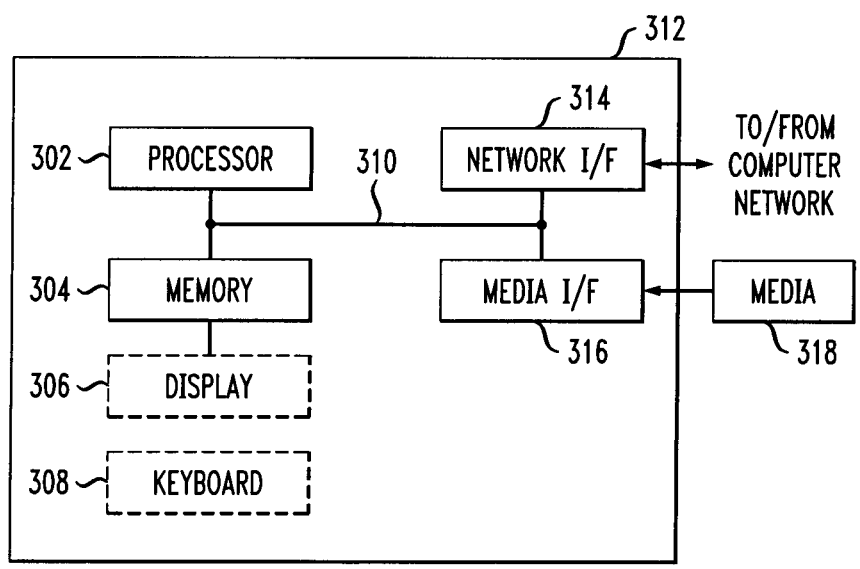
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, maintaining a standard reasoning process and using the justifications as a basis for computing the probability of a solution.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for computing a solution to a query formulated against a knowledge base (KB), wherein the method comprises:

receiving a query formulated against a knowledge base, wherein the knowledge base comprises a set of one or more axioms, wherein each axiom is annotated with a specific probability value indicating a degree of certainty assigned thereto;

ignoring each probability value of the one or more axioms and computing a solution to the query;

computing each of one or more justifications for the query solution, wherein computing each of one or more justifications for the query solution comprises determining a minimal set of one or more axioms in the knowledge base that entail the query solution; and using each probability value of the one or more axioms in each justification to compute a net probability of an inferred query solution.

2. The method of claim 1, further comprising outputting the query solution to a display.

3. The method of claim 1, wherein ignoring each of one or more probability values of one or more axioms and computing a solution to the query comprises computing a solution to the query via applying a standard reasoning algorithm.

4. The method of claim 1, further comprising taking into account one or more justifications for an inconsistency of the KB to ensure that there is no interaction between a contradictory part of the KB and a consistent subset that entails the query solution.

5. The method of claim 1, wherein computing a solution to a query formulated against a knowledge base further comprises maintaining a standard reasoning process unchanged.

6. The method of claim 1, further comprising using a probabilistic model to determine a cumulative probability of an inference given each probability value of the one or more axioms in each justification of the inferred query solution.

7. The method of claim 1, further comprising facilitating paraconsistent reasoning by returning a locally sound solution to the query in a presence of one or more global inconsistencies in the knowledge base.

8. The method of claim 1, wherein the query solution satisfies one or more constraints, wherein the one or more constraints comprise:

there exists a consistent sub-knowledge base of the knowledge base such that the query solution is a first order logic answer of the query against the sub-knowledge base; and the query solution is not a local answer to not(Q) against the knowledge base, wherein Q is the query.

9. The method of claim 1, further comprising enabling a user to specify a probabilistic threshold value for the query solution.

10. The method of claim 1, further comprising providing a system, wherein the system comprises one or more distinct software modules, each of the one or more distinct software modules being embodied on a tangible computer-readable recordable storage medium, and wherein the one or more distinct software modules comprise a non-probabilistic query solution finder module, a non-probabilistic justification computation module and a standard probabilistic reasoning over justifications knowledge base module executing on a hardware processor.

11. A computer program product comprising a tangible computer readable recordable storage medium including computer useable program code for computing a solution to a query formulated against a knowledge base (KB), the computer program product including:

computer useable program code for receiving a query formulated against a knowledge base, wherein the knowledge base comprises a set of one or more axioms, wherein each axiom is annotated with a specific probability value indicating a degree of certainty assigned thereto;

computer useable program code for ignoring each probability value of the one or more axioms and computing a solution to the query;

computer useable program code for computing each of one or more justifications for the query solution, wherein computing each of one or more justifications for the query solution comprises determining a minimal set of one or more axioms in the knowledge base that entail the query solution; and computer useable program code for using each probability value of the one or more axioms in each justification to compute a net probability of an inferred query solution.

12. The computer program product of claim 11, wherein the computer useable program code for ignoring each of one or more probability values of one or more axioms and computing a solution to the query comprises computer useable program code for computing a solution to the query via applying a standard reasoning algorithm.

13. The computer program product of claim 11, further comprising computer useable program code for comprising outputting the query solution to a display.

14. The computer program product of claim 11, further comprising computer useable program code for taking into account one or more justifications for an inconsistency of the KB to ensure that there is no interaction between a contradictory part of the KB and a consistent subset that entails the query solution.

15. The computer program product of claim 11, further comprising computer useable program code for using a probabilistic model to determine a cumulative probability of an inference given each probability value of the one or more axioms in each justification of the inferred query solution.

16. The computer program product of claim 11, further comprising computer useable program code for enabling a user to specify a probabilistic threshold value for the query solution.

17. The computer program product of claim 11, wherein the computer useable program code comprises one or more distinct software modules, and wherein the one or more distinct software modules comprise a non-probabilistic query solution finder module, a non-probabilistic justification computation module and a standard probabilistic reasoning over justifications knowledge base module executing on a hardware processor.

18. A system for computing a solution to a query formulated against a knowledge base (KB), comprising:

a memory; and at least one processor coupled to the memory and operative to:

receive a query formulated against a knowledge base, wherein the knowledge base comprises a set of one or more axioms, wherein each axiom is annotated with a specific probability value indicating a degree of certainty assigned thereto;

ignore each probability value of the one or more axioms and computing a solution to the query;

compute each of one or more justifications for the query solution, wherein computing each of one or more justifications for the query solution comprises determining a minimal set of one or more axioms in the knowledge base that entail the query solution; and use each probability value of the one or more axioms in each justification to compute a net probability of an inferred query solution.

19. The system of claim 18, wherein the at least one processor coupled to the memory operative to ignore each of one or more probability values of one or more axioms and computing a solution to the query is further operative to compute a solution to the query via applying a standard reasoning algorithm.

20. The system of claim 18, wherein the at least one processor coupled to the memory is further operative to output the query solution to a display.

21. The system of claim 18, wherein the at least one processor coupled to the memory is further operative to take into account one or more justifications for an inconsistency of the KB to ensure that there is no interaction between a contradictory part of the KB and a consistent subset that entails the query solution.

22. The system of claim 18, wherein the at least one processor coupled to the memory is further operative to use a probabilistic model to determine a cumulative probability of an inference given each probability value of the one or more axioms in each justification of the inferred query solution.

23. The system of claim 18, wherein the at least one processor coupled to the memory is further operative to enable a user to specify a probabilistic threshold value for the query solution.

24. The system of claim 18, further comprising a tangible computer-readable recordable storage medium having one or more distinct software modules embodied thereon, wherein the one or more distinct software modules comprise a non-probabilistic query solution finder module, a non-probabilistic justification computation module and a standard probabilistic reasoning over justifications knowledge base module executing on a hardware processor.

25. An apparatus for computing a solution to a query formulated against a knowledge base (KB), the apparatus comprising:
  means for receiving a query formulated against a knowledge base, wherein the knowledge base comprises a set of one or more axioms, wherein each axiom is annotated with a specific probability value indicating a degree of certainty assigned thereto;
  means for ignoring each probability value of the one or more axioms and computing a solution to the query;
  means for computing each of one or more justifications for the query solution, wherein computing each of one or more justifications for the query solution comprises determining a minimal set of one or more axioms in the knowledge base that entail the query solution; and
  means for using each probability value of the one or more axioms in each justification to compute a net probability of an inferred query solution.

* * * * *